United States Patent [19]
Phillips

[11] 4,067,808
[45] Jan. 10, 1978

[54] CHLORINATOR FOR A SWIMMING POOL

[76] Inventor: Ash S. Phillips, 2944 Park Ave., No. 2, San Jose, Calif. 95126

[21] Appl. No.: 667,262

[22] Filed: Mar. 15, 1976

[51] Int. Cl.² .............................................. E04H 3/20
[52] U.S. Cl. .................................. 210/169; 23/272.7; 23/272.8; 137/205.5; 137/564.5
[58] Field of Search ............ 23/272.8, 272.8 F, 272.7; 137/564.5, 205.5; 210/169

[56] References Cited
U.S. PATENT DOCUMENTS

| | | | |
|---|---|---|---|
| 2,563,211 | 8/1951 | Cassese | 137/564.5 |
| 2,984,250 | 5/1961 | Foster | 23/272.8 F |
| 3,052,525 | 9/1962 | Vogelmann | 23/272.8 F |
| 3,166,096 | 1/1965 | Long | 23/272.8 F |
| 3,474,817 | 10/1969 | Bates | 23/272.8 |
| 3,655,054 | 4/1972 | Parscini | 23/272.7 |

*Primary Examiner*—Stephen J. Emery
*Attorney, Agent, or Firm*—Leslie M. Hansen

[57] ABSTRACT

The chlorinator for a swimming pool with a recirculation system includes a container to hold a column of chlorine concentrate solution, and a pool water supply conduit with a flow regulator connected to a return conduit of the recirculation system. Some of the pool water is caused to slowly flow into the container forming a gradually increasing column of pool water above the chlorine concentrate solution inside the container. A layer of separating material, having a specific gravity between that of pool water and that of the chlorine concentrate solution, rests on the bottom of the pool water in the container and floats on top of the column of the chlorine concentrate solution, and effectively prevents mixing of these two liquids. The gradually increasing column of pool water in the container then gradually forces the chlorine concentrate solution out of the container through another supply conduit to a height between the top and bottom of the container. A feeder member, connected to the return conduit and positioned below the output of the chlorine concentrate supply conduit, receives the chlorine concentrate solution from this supply conduit to add it to the pool water returning to the swimming pool.

8 Claims, 4 Drawing Figures

CHLORINATOR FOR A SWIMMING POOL

The present invention relates to a chlorinator for a swimming pool with a recirculation system, and more particularly relates to a chlorinator for a swimming pool in which a chlorine concentrate solution is automatically added to the pool water being circulated in the recirculation system.

Many of the conventional swimming pools have a recirculation system with a pump to circulate some of the pool water from a drain through a return conduit in order to return the circulated pool water to the swimming pool. In the recirculation system, the circulated water is conveniently treated to be suitable for pool users by being filtered, heated and chlorinated, and thereafter returned to the swimming pool.

With respect to chlorination, the amount of chlorine in the pool water has to be below a concentration level that is harmful or irritable to pool users and above a concentration level that is effective for germicidal purposes. Even after the swimming pool water has been properly chlorinated, the amount of chlorine in the pool water will be decreased due to being dissipated because of evaporation, being used up in the utilization by the pool users, and for other reasons. Accordingly, in order to maintain the proper level of chlorine in the pool water, chlorine should be continuously or periodically added to the water in the swimming pool. Generally, a chlorinator will introduce suitable amounts of chlorine in the recirculation system to maintain an appropriate level of chlorine concentration in the swimming pool water.

Chlorinators of several different designs have been utilized for adding chlorine to swimming pool water. Many of them use a chlorine concentrate solution available from several commercial sources. Such a chlorine concentrate solution may for example contain sodium hypochlorite of 14% by weight and inert ingredients of 86% by weight. Whereas the specific gravity of pool water is close to that of pure water, i.e. 1, the specific gravity of such a chlorine concentrate solution is approximately 2.

In chlorinators of the prior art, the chlorine concentrate solution may be stored in an individual and separate container in which its contents are gradually removed in a manner that is not directly dependent upon the circulating water in the recirculation system. For example, another and separate pump driven by an electric motor may be used to gradually force the chlorine concentrate solution into the return conduit of the recirculation system. Due to the pool water being circulated by the recirculation system, the added chlorine concentrate solution is thereafter thoroughly and suitable mixed with the water in the swimming pool. However, such a chlorination system of the prior art requires the use of moving parts which wear out, corrode at times, thereby requiring periodic maintenance, and involve other disadvantageous features.

In accordance with the present invention, a chlorinator is provided for a swimming pool with a recirculation system in which a supply conduit enables some of the pool water in the return conduit of the recirculation system to be added to a container having a supply of chlorine concentrate solution. In the container, a separator, having a specific gravity between that of pool water and that of the chlorine concentrate solution, follows the top surface of the chlorine concentrate solution. The pool water is slowly added, e.g. drop by drop, above the separator in the container in an amount directly proportional to the water flow in the return line of the recirculation system. consequently, the pool water and the chlorine concentrate solution are not mixed. The superimposed columns of the two separated liquids increase in height to enable the chlorine concentrate solution to be gradually forced out of another supply conduit at a further reduced rate. Thereafter, the chlorine concentrate solution is caused to enter a feeder member connected to the return conduit of the recirculation system of the swimming pool to be suitably mixed with the pool water in the swimming pool.

It is therefore an object of this invention to provide an automatic chlorinator for a swimming pool.

Another object of this invention is to provide an automatic chlorinator for a swimming pool that doesn't contain parts which tend to corrode, rot, or wear out.

Still another object of this invention is to provide an automatic chlorinator for a swimming pool wherein the amount of pool water added to a container causes a corresponding amount of chlorine concentrate solution to flow out of the container into a feeder member in order to add the chlorine concentrate solution to the pool water in the swimming pool.

A further object of this invention is to provide a chlorinator for a swimming pool that can be utilized with existing recirculation systems thereof without extensive modifications.

A still further object of this invention is to provide a chlorinator for a swimming pool in which the amount of chlorine drawn from the chlorinator and added to the pool water of the swimming pool is dependent upon the flow of water in the recirculation system returning to the swimming pool.

Another object of this invention is to provide a chlorinator for a swimming pool which is simple, inexpensive, durable, highly efficient, and requires practically no maintenance.

Still another object of this invention is to provide a chlorinator for a swimming pool having a container with chlorine concentrate solution wherein pool water is applied at a slow rate, e.g. drop by drop, and prevented from effectively mixing with the chlorine concentrate solution.

Still another object of this invention is to provide a chlorinator for a swimming pool that contains no moving parts except for a floating layer of separating material.

Another object of this invention is to provide a chlorinator for a swimming pool that includes a feeder member to receive the chlorine concentrate solution and apply it without any moving parts to the recirculation system.

The novel features which are believed to be characteristic of the invention, both as to its organization and method of operation, together with further objects and advantages thereof, will be better understood from the following description considered in connection with the accompanying drawing in which.

GENERAL DESCRIPTION

Figure 1:
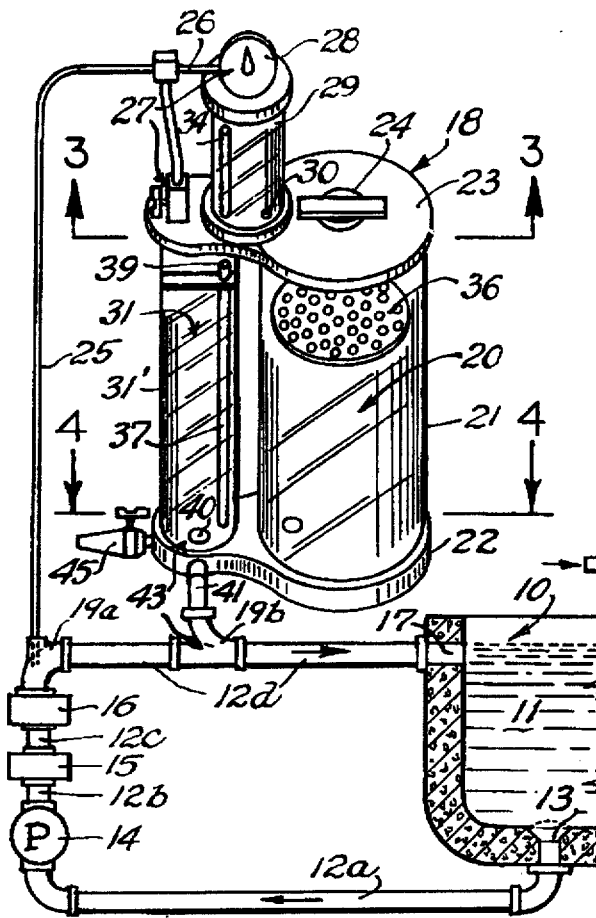
FIG. 1 is a diagrammatic view of a conventional swimming pool and its water recirculation system combined with the chlorinator of this invention.
Figure 3:
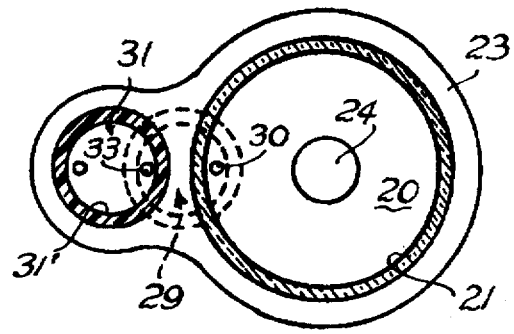
FIG. 3 is a cross sectional plan view toward the top of the container of the chlorinator taken along lines 3—3 of FIG. 2.

Referring now to FIG. 1, there is shown therein a swimming pool 10 filled with chlorinated pool water 11 and a conventional water recirculating system therefor. In such system pool water enters a conduit 12a from a bottom drain 13 to be circulated by the recirculating system back into the pool at a higher level. In the present disclosure the system is shown to include a pump 14 and conduits 12a, 12b, 12c, and 12d. Pump 14 is connected to conduit 12a to cause the circulating pool water to flow through conduit 12b to filter 15, and then through conduit 12c through heater 16. Thereafter, the circulating pool water flows through a return conduit 12d to discharge through outlet 17 back into swimming pool 10. The indicated pump, filter, heater, and conduit arrangement are conventional for a recirculating system of a swimming pool.

A chlorinator embodying this invention which is generally designated by the numeral 18 is connected at two places by couplers 19a and 19b to the return conduit 12d. This is in order to bypass a small amount of the circulating pool water at 19a into the chlorinator 18 to gradually add chlorine concentrate solution to the circulating pool water and back into the return line at 19b. The circulating pool water in return conduit 12d is returned to swimming pool 10 to be mixed with its pool water 11 in order to maintain the desired proportion of chlorine therein.

DETAILED DESCRIPTION OF THE INVENTION

Figure 2:
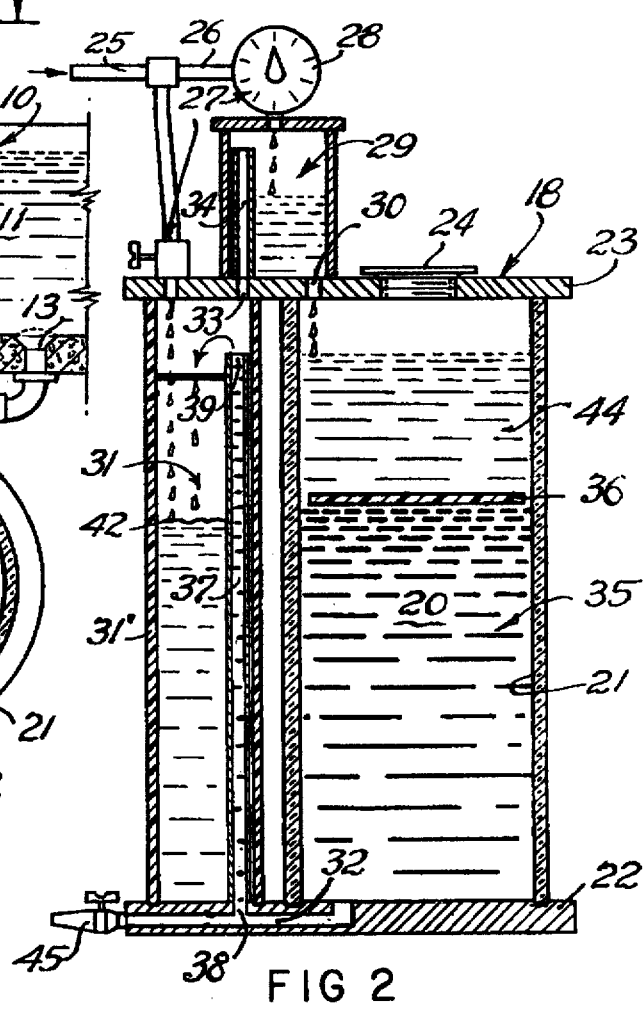
FIG. 2 is an enlarged vertical sectional view of the chlorinator shown in FIG. 1.

Referring now more specifically to FIG. 2, the chlorinator 18 of this invention is seen to include a large container 20 of sufficient volume to support a supply of chlorine concentrate solution. The container 20 is preferably in the form of a cylinder 21 which may be a glass or a plastic tube. The lower end of cylinder 21 is sealed to a bottom 22 and at its upper end to a top 23. The top 23 has an access opening provided with a cover 24 secured by threading thereto. A pool water supply conduit 25 has one end thereof sealed to and inserted through the coupler 19a of the return conduit 12d. Coupler 19a connects pool water supply conduit 24 to an upstream zone of the return conduit 12d in close proximity to the pump 14, to allow open end of the conduit 25 to receive some of the circulating pool therefrom. The supply conduit 25 extends upwardly and has its other end 26 disposed above the cylinder 20 to discharge the received pool water into the chlorinator 18. The coupler 19b is located further downstream from pump 14 where the water pressure is substantially lower. The pool water supply conduit 25 is tapped into the return conduit 12d at an upstream zone to provide a sufficient water pressure to enable the water received by pool water supply conduit 25 to rise to a height above the top of container 20. A regulating valve 27 is inserted in pool water supply conduit 25 to adjust and limit the flow of water into container 20 to a very slow rate, as for example, drop by drop at a rate of about two drops per second.

In the present disclosure the regulating valve 27 is preferably a metering valve with a dial 28 having indecia dependent upon the chlorination needed in the swimming pool water. The metered flow of bypassed pool water from the valve 27 enters the chlorinator 18 via a vestibule 29 mounted on the top 23 of the container 20. The bypass pool water entering the vestibule 29 normally exits therefrom via an aperture 30 formed through the top member 23 in the region of the upper end of the container 20. The aperture 30 is such a size as to allow the incoming pool water to escape by droplets dependent upon the column of such water accumulated in the vestibule 29 by metered flow from the valve 27. The bypassed pool water entering the container 20 has a specific gravity less than that of chlorine concentrate to be blended therewith.

Adjacent the cylindrical wall 21 of container 20 a vertical mixing chamber 31 in the form of a smaller diametered tube 31' is sealed at its ends between the top 23 and bottom 22 members of the container 20. The two cylindrical tubes 21 and 31' stand parallel to each other such that the chambers 20 and 31 have communication at their lower ends via a passage 32 formed between them in the bottom member 22.

The upper end of the mixing chamber 31 communicates with the vestibule 29 via a port 33 formed through the top member 23 and connected to an overflow tube 34 which stands within the vestibule. By this arrangement the upper regions of both the chamber 31 and the container 20 are in communication with each other to equalize the pressure above the fluids therein.

Container 20 is partially filled with a commercially available chlorine concentrate solution 35 to extend from bottom 22 up to approximately from one-half to three-quarters of the height of container 20. On the top surface of the chlorine concentrate solution 35, a separator 36 is placed. The separator 36 may be any material having a specific gravity lighter than that of the chlorine concentrate solution but greater than that of the pool water coming from the pump. In the present disclosure the separator 36 is shown as a circular plastic disc which will float on the chlorine concentrate solution 35, but will sink in water. In other words, separator 36 has a specific gravity between that of water and the chlorine concentrate solution. As seen more clearly in FIG. 2, the circumferential edge of separator 36 will clear the inner surface of the wall 21 of container 20. Separator 36 preferably has a diameter slightly less than the inner diameter of the circular cross-section of wall 21 of container 20, so that it can be moved up and down without restriction, yet cover most of the surface top area of the chlorine concentrate solution 35. Separator 36 may be made of polystyrene or other suitable plastic material. Separator 36 therefore becomes a layer of separating material between the chlorine concentrate solution 35 in container 20 and the pool water accumulated thereabove as herein before described.

A chlorine concentrate supply tube 37 is provided with one end 38 thereof connected to the bottom member 22 within the mixing chamber 31 and in communication with the passage 32 formed in member 22 to receive chlorine concentrate solution 35. The other end 39 of tube 37 extends upwards within the mixing chamber 31 to a height above the level of the chlorine concentrate solution 35 in container 20 to direct its output into the upper region of the mixing chamber 31. Since the upper regions of the chamber 31 and container 20 are in communication via the vestibule 29 and overflow tube 34 the downward pressure of the chlorine concentrate 35 within the container 20 is forced through the passage 32 in the bottom member 22 and up into the chlorine concentrate supply tube 37.

Figure 4:
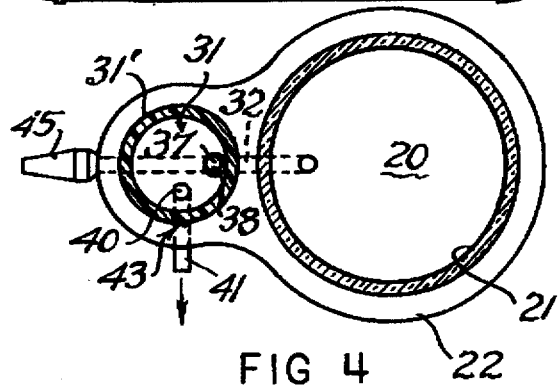
FIG. 4 is a cross sectional view similar to that of FIG. 3 taken along line 4—4 thereof to show the bottom plan thereof.

It will be noted in FIGS. 1 and 4 that the lower end of the mixing chamber 31 has an outlet port 40 formed through the bottom member 22. This outlet port 40 has communication with one open end of a conduit 41, the opposite end of which is connected to the coupler 19b in the return line 12d.

The discharge end of auxiliary conduit 41 is located in return conduit 12d at a distance downstream from pump 14 at a position of reduced water pressure so that the level of pool water only rises to a height 42 in mixing chamber 31 which is lower than its top open end 39 of the supply tube 37 therein.

Coupler 19b is similar to coupler 19a previously described. Mixing chamber 31 and auxiliary conduit 41 comprise a feeder member 43 herein connected to return conduit 12d to limit and hold any pool water rising within the chamber 31 to a level lower than that of the overflow end 39 of the tube 37 when the pool water flows through the return conduit under pressure.

In operating the chlorinator of this invention, cylinder 20 is initially filled with chlorine concentrate solution 35 to a height just below that of the overflow outlet 39 of tube 37. Some of the chlorine concentrate solution 35 will enter the tube 37 via passage 32 and rise to the same height as the concentrate in container 20, but will not overflow out of end 39 into chamber 31. When pump 14 is operating, some of the pool water flows through conduit 12a from drain 13 through conduit 12b, filter 15, conduit 12c, heater 16, and through return conduit 12d back into swimming pool 10 via outlet 17. As the pool water is circulated in the recirculation system, the water pressure in return conduit 12d causes some pool water to bypass via supply conduit 25 for discharge at its upper end into the vestibule 29. Regulating valve 27 is adjusted for the desired flow rate which is preferably low, i.e. at a measured rate. As the pool water enters vestibule 29, it will accumulate therein and escape, drop by drop via the aperature 30 above separator 36 forming a gradually increasing column of pool water 44 thereabove. The pool water 44 above the separator 36 does not mix with the chlorine concentrate solution 35, except for a negligible amount in the space between disc-shaped separator 36 and wall 21 of the chamber 20. However, the weight of the added water 44 in chamber 20 will force the column of chlorine concentrate solution 35 downwards forcing some of the chlorine concentrate solution 35 through passage 32 and up into a overflow tube 37. The weight of the water 44 above the separator 36 will ultimately cause the chlorine concentrate solution to overflow at 39 into the mixing chamber 31. The rate of discharge of the chlorine concentrate solution into the mixing chamber 31 will thereafter depend upon the rate of pool water input into container 20 via the aperture 30. For example, if one drop of chlorine concentrate solution is an heavy as two drops of water, then one drop of chlorine concentrate solution will be discharged into chamber 31 for every two drops of pool water entering container 20.

Within the chamber 31 of the feeder member, the pool water is limited from rising to a height higher than the top end 39 of the tube 37 dependent upon the pressure in return conduit 12d. It will be realized that as the chlorine concentrate solution is thus gradually introduced via supply tube 37, its added weight will cause a corresponding outflow of concentrated fluid admixture through outlet port 40 and conduit 41 into return line 12d. Thence the rechlorinated mixture flows into swimming pool 10 via outlet 17, to be mixed with the swimming pool water 11. During the operation of pump 14, this process continues until the amount of chlorine concentrate solution 35 in container 20 is exhausted. Thereafter, all that needs to be done is to drain container 20 by opening a drain valve 45, reclose valve 45, and refill container 20 with some more chlorine concentrate solution 35. Thereafter, the chlorinator will continue to operate as above described.

While I have described the herein chlorinator in specific detail, it will be appreciated by those skilled in the art that the structure, shapes and proportions thereof may be susceptible to variations, alterations and/or modifications without departing from the spirit or scope of the invention therein as set forth in the appended claims.

What I claim as new and desire to protect by Letters Patent is:

1. A chlorinator for a swimming pool having a pool water recirculating system in which a drain line at the base of the pool is connected to a pump and a return line leading back into the pool, a bypass system comprising:
    1. a vertically arranged container located above the return line for holding a supply of chlorine concentrate solution;
    2. a layer of separating material having a specific gravity between that of the pool water and that of the chlorine concentrate solution and arranged upon the latter so as to float thereon within said container;
    3. a pool water supply conduit having one end connected to an upstream zone of the return line and its opposite end disposed above said container;
    4. a regulating valve in said pool water supply conduit for metering the flow of pool water therefrom and for discharging the pool water in a measured rate into the upper region of said container above said layer of separating material therein;
    5. a chlorine concentrate supply tube arranged vertically adjacent said container with its upper end disposed above the level of the layer of separating material therein and having its lower end communicating with the lower end of said container for receiving chlorine concentrate solution therefrom;
    6. a mixing chamber arranged vertically adjacent said container in a position to receive chlorine concentrate solution from the open upper end of said chlorine concentrate supply tube as its overflows therefrom due to the added weight of pool water at rest upon said separator therein, said mixing chamber being a tubular member parallel to and circumscribing said chlorine concentrate supply tube and having its lower end closed except for its communication with the downstream zone of the return line;
    7. said vertically arranged container and said mixing chamber having their upper ends closed by a common top;
    8. means for communicating the upper ends of said vertically arranged container and tubular member of the mixing chamber for equalizing the pressure therein to allow the chlorine concentrate solution transferred from the container to rise within said chlorine concentrate supply tube dependent upon the measured rate of discharge of pool water into the upper region of said container; and
    9. a feeder member for communicating the lower end of said mixing chamber with a downstream zone of the return line for discharging a metered quantity of chlorine concentrate solution into the return line and the pool water therein as it returns to the swimming pool 2. The chlorinator in accordance with that of claim 1 in which said layer of separating material is a plastic disc.

3. The chlorinator in accordance with that of claim 1 in which said vertically arranged container and tubular member of the mixing chamber have their lower ends sealingly secured to a common bottom, and including a passage formed in said common bottom to provide the communication between the lower ends of said mixing chamber and said container.

4. The chlorinator in accordance with that of claim 3 including a drain plug in said common bottom communicating with said passage therein.

5. The chlorinator in accordance with that of claim 1 in which the means for communicating and equallizing the pressures in the upper ends of said mixing chamber and container comprises:
 1. a vestibule mounted on the common top thereof and partially overlying each of said mixing chamber and container;
 2. an aperture formed through said common top above said container and within said vestibule; and
 3. a port formed through said common top above said mixing chamber and within said vestibule.

6. The chlorinator in accordance with that of claim 5 in which said pool water supply conduit has its discharge end disposed above and in communication with said vestibule for discharging pool water at a metered rate into the latter.

7. The chlorinator in accordance with that of claim 6 in which the aperture formed through said common top is restricted in size to pass pool water from said vestibule at a measured rate into the upper region of said container.

8. The chlorinator in accordance with that of claim 7 including an overflow tube arranged in said vestibule and having its lower end communicating with the port formed through said common top and its upper end above said common top to collect a reserve of pool water within said vestibule for measured flow into said container via the aperture and for discharging any overflow into said mixing chamber.

* * * * *